United States Patent Office 3,711,308
Patented Jan. 16, 1973

3,711,308
COLORED NACREOUS PIGMENTS
Dieter Brand and Reiner Esselborn, Darmstadt, Germany, assignors to Merck Patent Gesellschaft mit beschrankter Haftung, Darmstadt, Germany
No Drawing. Filed Nov. 25, 1970, Ser. No. 92,944
Claims priority, application Germany, Nov. 29, 1969, P 19 59 998.5
Int. Cl. C09c 1/00
U.S. Cl. 106—291
22 Claims

ABSTRACT OF THE DISCLOSURE

Colored nacreous pigments are provided based on mica flakes coated with two superimposed layers, the first layer being titanium and/or zirconium oxide mixed with another metallic oxide, the latter being preferably an oxide having an inherent color, e.g. iron oxide. The second layer consists solely of titanium and/or zirconium oxide and is about twice as thick as the first coating.

The pigments are produced by feeding into an aqueous suspension of mica flakes at a substantially constant temperature between about 50 and 100° C. and at a substantially constant pH between 0.5 and 5.0:

(a) an aqueous metallic salt solution consisting essentially of a member selected from the group consisting of a titanium salt, a zirconium salt and mixtures thereof, said member being in a concentration of 0.01–4.0 mol/liter, said another salt of a metal selected from the group consisting of iron, chromium, nickel, cobalt, antimony, aluminum, silicon, tin, bismuth, and mixtures thereof, said other salts being in a total concentration of 0.02–1 mol/liter, said solution having a content of free acid corresponding to a molarity of 0.002–3;

(b) after the feeding of solution (a), feeding an aqueous, 0.01 to 4 molar molar solution consisting essentially of only a member selected from the group consisting of a titanium salt, a zirconium salt, and mixtures thereof, said solution having a content of free acid corresponding to a molarity of 0.002–3;

(c) simultaneously with the feeding of both (a) and (b), passing into the suspension an aqueous, 0.025- to 10-molar basic solution of a base selected from the group consisting of an alkali metal hydroxide, ammonium hydroxide, or an equivalent amount of gaseous ammonia; with the provisions that:

(d) the amount of salt fed per minute is approximately $0.01-25 \cdot 10^{-5}$ mol per m.$^2$ of mica surface, (e) the thickness of the metallic oxide layer precipitated by solution (a) amounts to about one-third of the total coating thickness of the precipitated oxide layers.

BACKGROUND OF THE INVENTION

This invention relates to the production of colored nacreous pigments based on a mica base coated with titanium or zirconium oxides.

It is known that mica flakes having a layer of titanium dioxide are useful nacreous pigments. It is also known that the luminosity of such pigments can be improved by applying onto the titanium dioxide coating an additional layer containing other metallic oxides, for example, colorless oxides, e.g. zirconium dioxide, aluminum oxide, zinc oxide, antimony oxide, or tin oxide, or also colored oxides, e.g. iron oxides, copper oxide, nickel oxide, cobalt oxide, or chromium oxides. (U.S. Pats. 3,087,828 and 3,087,829, both issued Apr. 30, 1963.) Other known pigments include those which exhibit interference colors from coatings of iron (III), chromium (III), and vanadium (V) oxides on suitable mica flakes. Such known pigments, though useful, are not completely satisfactory from an aesthetic viewpoint.

With respect to the processes employed to produce such pigments in one process, mica flakes finely distributed in an aqueous suspension are coated at the boiling temperature of the water with titanium dioxide hydrate by hydrolysis of acidic titanium sulfate solutions. However, it is impossible according to this method to obtain a uniformly thick and homogeneous layer of titanium dioxide on the surface of the mica. Consequently, by this method, there are produced pigments having a relatively pale color. In the case of non-uniform coatings, the hues produced at different layer distances partially interfere with white and thus result in pale color hues. The disadvantages attendant to the aforesaid process become especially apparent upon the addition to the titanium salt solution of metallic ions, which, as oxides, have an inherent color. Owing to the non-uniform coating, the gold, red, blue, and green hues are especially very weak in color.

To produce satisfactorily uniform layers, controlled coating from the gaseous phase, though feasible, is technically difficult and economically unattractive.

More recently, a non-gaseous phase process to produce a uniform coating of TiO$_2$ on a base, e.g. mica, resulting in high quality nacreous substances, is disclosed in copending allowed U.S. application Ser. No. 791,861, filed Jan. 2, 1969, now Pat. No. 3,553,001, issued Jan. 5, 1971. This allowed application, however, does not pertain to the specific problems involved in producing colored nacreous pigments by the addition of small quantities of other metallic ions to the titanium salt solution. It is further to be noted that one or more references cited in this allowed application may or may not be of interest.

SUMMARY OF THE INVENTION

Relevant to the above recited background of this invention, a principal object is to provide improved colored nacreous pigments, e.g. nacreous gold pigments.

Another object is to provide an improved non-gaseous phase process for the production of colored nacreous pigments.

Other objects include the provision of compositions and articles of manufacture ornamented by the pigments of this invention.

Upon further study of the specification and appended claims, other objects and advantages of the present invention will become apparent.

To attain these objects, there are provided novel pigments produced in a novel manner. The pigments are characterized in that the mica flakes are provided, on each side, with two superimposed, firmly adhering layers of a uniform thickness, wherein the bottom layer in contact with the mica is a mixture of oxides (optionally hydrated) of titanium and/or zirconium and one or more metallic oxides, preferably having an inherent color, and the upper layer disposed above the bottom layer, consists solely of titanium dioxides and/or zirconium dioxide, the oxides being optionally hydrated. The content of metallic oxides having an inherent color must not exceed 8% by weight of the total weight of pigment, and the thickness of the upper layer is about twice the thickness of the lower layer.

For the production of such multilayer nacreous pigments, there are added to an aqueous suspension of mica flakes, the following constituents, at temperatures of between 50 and 100° C. and a pH of between 0.5 and 5.0:

(a) an aqueous solution of metallic salts, containing a titanium and/or zirconium salt in a concentration of 0.01–4.0 mol/liter, and also at least one other metallic salt in a concentration of 0.02–1 mol/liter, with a content of free acid corresponding to a molarity of 0.002–3;

(b) after solution (a) is consumed, an aqueous, 0.01–4 molar titanium salt and/or zirconium salt solution having a content of free acid corresponding to a molarity of 0.002–3;

(c) simultaneously with (a) and then (b), an aqueous, 0.025–10 molar alkali hydroxide or ammonium hydroxide solution, or an equivalent amount of gaseous ammonia, with the following conditions:

(d) the introduction of the base is controlled so that, during the entire hydrolytic precipitation step, a substantially constant pH is maintained, (e) the feed rate of salt is approximately $0.01–25 \cdot 10^{-5}$ mol/minute and $m.^2$ of mica surface, (f) The thickness of the metallic oxide layer precipitated by solution (a) amounts to about one-third of the total layer thickness of the precipitated oxide layers.

DETAILED DISCUSSION OF THE INVENTION

By accurately maintaining the process conditions, very uniform coatings are obtained, and pigments having especially radiant colors and a high luster are produced. The concomitantly precipitated additional metallic oxides are incorporated into the titanium or zirconium dioxide layer, forming substitutional solid solutions containing, as the host components, titanium dioxide in the crystalline modification of rutile or anatase, or zirconium dioxide, and, as the foreign component, the additional metallic oxides. These further metallic oxides are preferably coloring metallic oxides which can also be optionally employed in a mixture with colorless oxides. The particularly advantageous pigments of the present invention are obtained only if the metallic oxides are positioned, together with the titanium and/or zirconium dioxide, in a layer between the mica and the external coating, the latter consisting essentially only of titanium dioxide and/or zirconium dioxide. The thickness of the layer with the mixed metallic oxides is to be only about one-third (plus or minus 10%) of the thickness of the total coating. Also in this connection, if the additional metallic oxides are contained in the thicker layer, or throughout the entire coating, the resultant pigments exhibit a lower chromaticity.

It is important for the novel nacreous pigments to have a very smooth surface, corresponding to the smooth surface of the mica flakes employed as the coating substrate. Such smooth surfaces can be obtained, however, only when observing the exact conditions of the process. The hydrolysis must, accordingly, be conducted substantially at a constant temperature, a constant pH, and a constant feed rate of the metallic salt solutions. In this connection, it is important to avoid an excess of metallic ions in the suspension. Thus, only that amount of metallic salt may be fed per unit time to the hydrolysis step which can be adsorbed as hydrated metallic oxide by the surface of the mica per unit time. Only by preventing free hydrated metallic ions or metallic oxide particles unbound to the surface of the mica from being present in the suspension, can there be obtained coatings which are homogeneous, amorphous and have equal and uniform layer thicknesses.

The coating substrate consists preferably of transparent mica flakes, for example of the type of mica called muscovite. However, it is also possible to employ synthetic mica. These are especially preferred light types of mica, poor in coloring metallic compounds. In special cases, however, slightly colored mica types are also suitable for obtaining a specific color effect.

The mica flakes to be employed exhibit, depending on the desired subsequent use of the nacreous pigment, a diameter of about 2–1,000 microns, preferably 5–50 microns, and a thickness in the range of about 0.05–1 micron, preferably about 0.1 micron. Mica, the thickness of which exceeds 1 micron, is unsuitable for the nacreous pigments according to the present invention. The mica flakes are to be as uniform as possible with respect to thickness and diameter. Therefore, it is advantageous to classify the mica after cleaving and grinding. The surface of the mica flakes is to be as planar and smooth as possible.

The additional metallic oxides present in the novel nacreous pigments according to this invention are preferably coloring metallic oxides which can optionally also be employed in a mixture with colorless oxides. The coloring metallic oxides are oxides of those metals which can occur in various valences, and the ionic radii of which approach the ionic radii of titanium and zirconium, and thus are in the range of about 0.4–0.9 A. They can then be incorporated into the $TiO_2$- or $ZrO_2$-lattice during annealing. Preferred are the metallic oxides of iron, chromium, nickel, and/or cobalt, especially iron (III) oxide, chromium (III) oxide, nickel (II) oxide, and cobalt (II) oxide, which can be employed, in each case, either individually or in a mixture. The proportion of these coloring metallic oxides in the total pigment is to be below 8% by weight, preferably between 2 and 3%, and this proportion is contained in the first (bottom) layer.

It is also possible to employ the coloring metallic oxides in a mixture with colorless oxides; in this connection, special effects are obtained in many cases. Such colorless oxides are, for example, $Sb_3O_3$, $Al_2O_3$, $SiO_2$, $SnO_2$ and/or $Bi_2O_3$. The proportion of these colorless oxides in the total pigment normally is not to exceed 10% by weight. Special advantages, in particular, result when simultaneously precipitating antimony salts with salts of the above-mentioned coloring metals, for example with nickel, cobalt, and chromium.

The total coating thickness of the precipitated layers ranges, depending on the desired color hue, for example between 30 and 180 nanometers (nm.). As is known, with an increase coating thickness, the color continuously chages from bluish grey through silver, gold, orange, red, violet, and blue into green. Thereafter, interference colors of a higher order are obtained. Preferred coating thicknesses are in the range of between 30 and 180 nm., because they correspond to interference colors of the first order.

The novel pigments are to be composed in such a manner that the thickness of the bottom layer, containing the mixture with the additional metallic oxides, in each case, is about 33% plus or minus 10% of the selected total coating thickness, and the top layer, containing only titanium oxide and/or zirconium oxide, is, in each case, about 67% plus or minus 10% of the selected total coating thickness.

In this manner, beautiful gold pigments are obtained according to the present invention with total coating thicknesses of about 60–80 nm. (about 20–27 nm. for the mixed oxide layer and about 40–54 nm. for the top layer). A preferred purple pigment according to the invention exhibits, after annealing, a total coating thickness of about 90–100 nm., composed of about 30–33 nm. for the mixed oxide layer and, correspondingly, about 60–66 nm. for the external oxide layer.

The thus-obtained pigments are relatively sensitive to light, but can be suitably stabilized by calcining at temperatures of about 700–1100° C., preferably about 900–1000° C., in a conventional manner. This also renders the pigments resistant to temperature extremes.

The pigments are produced under conditions which must be accurately maintained. The hydrolysis of the metallic salts to precipitate the metallic oxides is conducted substantially at a constant temperature plus or minus 10° C., preferably 5° C., constant pH plus or minus 2 pH, preferably 0.5 pH units, and constant feed rate of the metallic salt solutions plus or minus $1 \cdot 10^{-5}$, preferably $0.5 \cdot 10^{-5}$ mols per minute per $m.^2$ of mica surface.

The mica flakes to be coated are provided in an aqueous suspension, suitably in a concentration of about 5–40% by weight. It is preferable for the water used as the suspension medium to be desalinated. It is advantageous to adjust this suspension, with the aid of acidic titanium salt and/or zirconium salt solution, prior to the onset of hydrolysis, to a pH of between 1.0 and 7.0, preferably at a pH of between 1.5 and 4.0. This technique surprisingly gives better results than acidulating by the addition of straight acid.

Thereafter, the suspension is then heated from about room temperature, e.g. 20–25° C. to temperatures of 50–100° C., preferably about 70–75° C. Normally, a higher pH is again obtained during this step, which is adjusted, by the addition of acid, to a pH of between 1.0 and 7, preferably between 1.5 and 4. Then, under thorough agitation, a 0.01- to 5-molar salt solution is introduced into this heated solution, which salt solution contains titanium salt and/or zirconium salt, as well as additional metallic salts. The content of titanium salt and/or zirconium salt ranges between 0.01 and 4 mol/l., whereas other metallic salts are present in a concentration of about 0.02–1, preferably about 0.2 mol/l. The molar ratio of said other metallic salts to the titanium or zirconium salt is about 0.5:1 to 12:1, preferably 1:1 to 8:1. The preferred total concentration of salts is between 0.2 and 2 molar, especially 0.3–0.8 molar. The salt solution exhibits a concentration of free acid of 0.002–3 mol/l.

This mixed salt solution is uniformly introduced into the suspension, advantageously below the surface of the liquid at one or more points. The feed rate to be selected depends on the efficiency of the agitator, the quicker the mixing, the higher the rate. In any case, the feed rate is regulated in such a manner that approximately 0.01 to $25 \cdot 10^{-5}$ mol of metallic ions is introduced per minute per m.$^2$ of the surface to be coated. Simultaneously with the introduction of the mixed metallic salt solution, there is introduced an aqueous, 0.025- to 10-molar alkali or ammonium hydroxide solution, or an equivalent amount of gaseous ammonia, preferred alkali hydroxides being sodium and potassium hydroxide. The addition of the base is controlled in such a manner that the pH is maintained substantially constant, as that selected in the beginning of the coating step in the predetermined range of pH=1–7, the variation in pH during the process essentially being less than 2, preferably 0.5 pH units.

In certain cases, it is also possible to add buffer systems in order to maintain a pH constant, for example phosphate, acetate, citrate, and glycocoll buffers. These buffers can either be present in the mica flake suspension or, more advantageously, can be added together with the alkali or ammonium hydroxide solution. In many cases, however, the addition of further foreign ions is undesired, so that it is preferred to maintain the desired pH value constant by an exact metering procedure.

When the layer applied by the mixed metallic salt solution has reached the desired thickness, a solution of titanium salt and/or zirconium salt is fed in place of the mixed metallic salt solution. This solution is likewise about 0.01- to 4-molar and has a content of free acid corresponding to a molarity of 0.002–3. Suitably, the second layer, which is to be about two-thirds of the total coating, is precipitated with the same coating speed as the first layer, and preferably subsequently without delay.

The coating period can be substantially varied. This duration is dependent on the concentration of the metallic salt solutions fed thereto, the surface area of the substance to be coated, and on the rate of bulb and molecular diffusion of the salt solutions in the suspension, i.e., on the mechanical agitation. The solutions are most advantageously fed to the mica suspension through suitable metering devices, e.g. flow meters positive displacement metering pumps. It is, of course, highly advantageous for the feed rate, the pH, and the temperature to be controlled automatically; conventional techniques can be used. The nacreous pigment obtained in accordance with this invention, with two layers on both the front and back faces of each mica flake, can be conventionally worked up and isolated from the reaction mixture. Advantageously, the pigment is additionally tempered for about 2–4 hours under agitation in the suspension at about 50–100° C., and thereby improved in quality from the standpoint of further processing and luster. Thereafter, the pigment is suitably washed, optionally after first adjusting the pH to 5–7. It is a particular advantage of this invention that the pigment can then be washed in the neutral range with water. The drying step is conducted in a conventional manner.

It is advantageous to calcine the dried pigment in a known manner at 500–1100° C. to make it resistant against the effects of light and temperature.

With an increasing calcining (annealing) temperature and time, there occur in case of the titanium dioxide-containing pigments first the anatase lines and then the rutile lines in the X-ray diagram. The transition from anatase to rutile is accelerated during the calcining by the added metallic oxides. The additional, preferably coloring metallic oxides yield no lines at all, or only extremely weak lines, in the X-ray diagram, since apparently the content of metallic oxides is too low. As is known, the interference colors as well as the inherent color of the pigment are changed with the level of the calcining temperature. The coloring metallic oxides, after calcining, form colors with the non-coloring metallic oxide which markedly deviate from the color of the individually calcined coloring metallic oxides. Thus, Fe$_2$O$_3$ alone is red after being calcined at 500–1000° C., but Fe$_2$O$_3$, calcined together with a non-coloring metallic oxide (e.g. TiO$_2$) under identical conditions, is yellow.

Suitable metallic salts are basically all water-soluble salts of the above-mentioned metals; preferably, the chlorides are employed. These exhibit the advantage over the sulfates, which are the other inexpensive and readily obtainable salts, insofar as the chloride ion is not as firmly bound in the metallic oxide hydrate as the sulfate ion. Consequently, it can be washed out more easily. For this reason, the light fastness of the pigment is often also negatively affected by bound sulfates. Salts which can be employed are, for example, iron (III) chloride or sulfate, chromium (III) chloride or sulfate, nickel (II) chloride or sulfate, cobalt (II) chloride or sulfate, antimony (III) chloride, aluminum chloride, tin (II) chloride and/or bismuth chloride. In order to precipitate SiO$_2$, water-soluble silicates are preferably employed, for example water glass.

When employing zirconium salts in place of or in a mixture with titanium salts, the complete nacreous character of the color pigments generally appears only after calcining.

According to the present invention, there are obtained especially advantageous nacreous pigments superior by far to the previously known pigments with respect to color and luster. Thus, it is possible to obtain, for example, by coating mica flakes with a layer of titanium dioxide and iron (III) oxide and a superimposed layer of titanium dioxide, a gold pigment, which can be incorporated into plastics, for example, to yield articles which do not differ with respect to color, luster, and beauty from those articles coated with metallic gold.

The colors of hte nacreous pigments can best be observed when the pigments are incorporated into plastic films. They can, of course, be dispersed in the conventional vehicles, in the same manner as the lustrous pigments known heretofore subjected to further processing. The novel pigments are also especially suitable for cosmetic purposes, since they are composed of physiologically acceptable metallic oxides. However, they are mainly employed as pigments for plastics, cosmetic articles, such as lipsticks and soap, glass, ceramics, varnishes, paints, as well as natural and synthetic rubber articles. They are enthusiastically accepted because of their high lightfastness and weatherability. Furthermore, because of their temperature and stability, they are also suitable for enamels, for the coloring of frits and of baked ceramics. Normally, the pigments are employed in amounts of up to 30%, preferably about 0.5–10%. In plastics, the proportion is usually low, for example 0.5–3%, whereas it is possible to employ in cosmetic preparations, for example lipsticks, up to 30%, preferably about 5–25%, based on the entire lipstick mass. (All percentages are by weight unless otherwise indicated.)

The novel pigments exhibit, for example after incorporation into plastic films, brilliant hues which do not change even when varying the angle of observation—in contrast to pigments, based solely on interference colors. For example, a gold-colored pigment according to the present invention, when viewed by incident light, exhibits a brilliant, beautiful gold color, and by transmitted light, the yellow inherent color of the iron-titanium oxide. In contrast, a corresponding pigment without a coloring metallic oxide exhibits, by incident light, a weaker yellowish-gold interference color, but when viewed by transmitted light, exhibits the light-blue complementary color.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In these examples, all percentages are by weight, unless otherwise noted.

(A) PREPARATION OF THE PIGMENTS

Example 1

15 kg. of light-colored ground/mica of the muscovite type, particle size about 10–30 microns, thickness about 0.1 micron, is suspended in 150 liters of desalinated water. The suspension is adjusted to a pH of 2 with a hydrochloric titanium tetrachloride solution (250 g. $TiCl_4$/l. and 30 g. free HCl/l.). The suspension is heated, under agitation, to 70° C. and maintained at this temperature during the entire coating process. The pH, having increased to about 6 after the heating step, is again adjusted to pH 2 by the addition of 10% hydrochloric acid.

In another vessel, 1.7 kg. of $FeCl_3 \cdot 6H_2O$ dissolved in 1.0 liter of hydrochloric acid (specific gravity=1.19) and 10 liters of water, is admixed to 36 liters of 25% hydrochloric titanium tetrachloride solution (hydrochloric acid content 3%). The thus-obtained brown titanium salt/iron salt solution is allowed to flow into the mica suspension at a rate of 9 liters per hour. By the simultaneous introduction of 35% sodium hydroxide or by the addition of gaseous ammonia, the pH of the suspension is maintained constant, at 2.

Once the addition of the brown, iron-containing titanium salt solution is terminated, a 25% hydrochloric titanium tetrachloride solution is introduced at the same rate into this suspension. This solution is produced beforehand by dissolving 18 kg. of $TiCl_4$ in 25 liters of desalinated water, with the addition of 48.5 liters of 37% HCl (sp. gr.=1.19).

The duration of the coating process is about 12 hours. The termination of precipitation is determined by color comparison with a standard and in this case the precipitation was interrupted when a total of about 27 kg. of $TiCl_4$ and 1.7 kg. of $FeCl_3 \cdot 6H_2O$ were consumed. The thus-obtained lustrous pigment exhibited the interference color orange and a yellow-gold grain color.

It is advantageous for the pigment to be tempered in the suspension for about 2–4 additional hours at 70° C. The pH of the suspension can also be increased to 5–7 during this step by the gradual addition of sodium hydroxide solution. The gold pigment is then washed free of salt with water and dried on racks at about 120° C. After drying, the pigment is annealed for 60 minutes at 950° C. After the annealed pigment has been cooled, the brownish-yellow hue of the pigment becomes a stronger gold color and a purer shade. The admixed interference color orange reverts to yellowish gold.

Approximately 27 kg. of this gold colored pigment is obtained, consisting of (on a weight basis) 58% mica, 40% $TiO_2$, and 2% $Fe_2O_3$, wherein about another 2% $Fe_2O_3$ is contained in the mica as a natural component.

With an annealing period of 60 minutes, the lines of rutile can also be detected in the X-ray diagram, whereas, after the annealing period of 30 minutes, the $TiO_2$ is present in the form of anatase.

Example 2

10 kg. of ground mica of the muscovite type, particle size about 5–10 microns, thickness 0.1 micron, is suspended in 150 liters of desalinated water in a 400 liter kettle. The suspension is adjusted to a pH of 3.5 with hydrochloric titanium tetrachloride solution (250 g. of $TiCl_4$/l. and 30 g. of HCl/l.). The suspension is heated under agitation to 70° C. and maintained at this temperature during the entire coating process. The pH, which has risen to about 5–7 after heating, is again adjusted to a pH of 3.5 by the addition of 10% hydrochloric acid.

1.80 kg. of $FeCl_3 \cdot 6H_2O$ is dissolved, with the addition of 5 liters of 37% hydrochloric acid, in 11 liters of desalinated water and mixed with 48 liters of a 25% hydrochloric titanium tetrachloride solution. The mixed salt solution contains approximately 3% of hydrochloric acid.

The thus-obtained brown salt solution is allowed to flow into the suspension at a rate of 7 liters per hour. Simultaneously, the pH is maintained at 3.5 by the addition of 35% sodium hydroxide containing 3% sodium acetate as a buffer.

Once the addition of the brown salt solution is terminated, about 96 liters of colorless 25% hydrochloric titanium tetrachloride solution is introduced into the suspension at the same rate.

The duration of the coating process is about 21 hours. The coating step is terminated when the pigment has reached the color determined by comparison with a standard. In the present case, the precipitation is ended after a total of 30 kg. of $TiCl_4$, as well as 1.80 kg. of $$FeCl_3 \cdot 6H_2O$$

have been consumed. The thus-obtained pigment is subsequently tempered in the suspension for 2–4 hours at 50–100° C., then washed salt-free with water, and dried at about 110° C. Thereafter, the product is subjected to annealing at 950° C. for about 45 minutes in order to improve the lightfastness, temperature stability, luster, and chromaticity of the pigment.

In this manner, 25.5 kg. of a fine gold pigment is obtained containing about 39% mica, 59% $TiO_2$, and about 2% $Fe_2O_3$. This finer gold pigment is especially suitable for the cosmetics industry, for example, as an admixture to lipsticks and pastes.

Example 3

10 kg. of ground mica of the muscovite type, particle size 10–30 microns, thickness 0.1 micron, is suspended in 100 liters of desalinated water. The suspension is adjusted to a pH of 2.5 by means of an acidic titanium tetrachloride solution (250 g. of $TiCl_4$/l. and 30 g. of HCl/l.). The suspension is heated to 75° C. under agitation; this temperature is maintained during the entire coating process. The pH which has risen to 5–7 after the heating of the suspension is again adjusted to a pH of 2.5 by the addition of approximately 10% hydrochloric acid.

2.66 kg. of $CrCl_3 \cdot 6H_2O$ is dissolved, together with 1.14 kg. of $SbCl_3$, in 1 liter of 37% hydrochloric acid and 12 liters of water, and added to 30 liters of a 25% hydrochloric titanium tetrachloride solution (acid content of the mixed salt solution: 3%).

The green salt solution is allowed to flow into the mica suspension at a rate of 7 liters per hour. Once the addition of this solution has been terminated, a colorless 25% hydrochloric titanium tetrachloride solution is introduced into the suspension at the same rate (250 g. of $TiCl_4$/l. and 30 g. of HCl/l.).

Simultaneously with the salt solutions, 35% aqueous NaOH is added in each case, in order to maintain the pH at 2.5. Approximately 80 liters of this sodium hydroxide solution is consumed.

The precipitation is terminated after about 20 hours. During this process, a total of about 31 kg. of titanium tetrachloride has been consumed. Thereupon, the pH is gradually adjusted to 7 by slowly adding dilute aqueous sodium hydroxide solution (20%). The slightly greenish pigment is then tempered in the suspension at 70° C. for about 3 hours, washed salt-free with water, dried at about 120° C., and annealed at 950° C. for 30 minutes, thus obtaining approximately 25 kg. of a gold pigment containing about 40% mica, about 54.2% $TiO_2$, about 3% $Cr_2O_3$, and 2.8% $Sb_2O_3$. After annealing, the pigment exhibits a yellowish golden color. At the same time, it exhibits a green interference color.

Example 4

20 kg. of ground mica of the muscovite type, particle diameter 10–30 microns, thickness less than 0.1 micron, is suspended in 150 liters of desalinated water, the latter having previously been adjusted to a pH of 3 with hydrochloric titanium tetrachloride solution (250 g. of $TiCl_4$/l. and 30 g. of HCl/l.).

The suspension is agitated and heated to 70° C. Thereafter, the pH of the suspension is adjusted to 3 by the addition of additional amounts of the above-mentioned hydrochloric titanium tetrachloride solution.

8.10 kg. of $NiSO_4 \cdot 7H_2O$ is dissolved, together with 5.2 kg. of $SbCl_3$, in 30 liters of water and mixed with 3.5 liters of HCl (37%). This green salt solution is mixed with 50 liters of a 25% hydrochloric titanium tetrachloride solution (hydrochloric acid content, in total, 3%). The green solution is allowed to flow into the mica suspension at a rate of 12 liters per hour. Once the addition of this solution is terminated, a colorless 25% hydrochloric titanium tetrachloride solution (30 g. of HCl/l.) is introduced into the suspension at the same rate. By the simultaneous addition of a 20% aqueous potassium hydroxide solution, a pH of 3 is maintained during the entire precipitation step. Approximately 160 liters of this potassium hydroxide solution is consumed.

The coating period is about 14 hours. The precipitation is terminated when a total of 36 kg. of titanium tetrachloride has been consumed. The thus-obtained gold colored pigment is tempered in the suspension for another 2 hours at 70° C.; thereafter, the pH is adjusted to 6–8 by the gradual addition of KOH. Then, the tempering step is continued for another 2 hours at this pH and at 70° C. The pigment is thereafter washed free of salt with water, dried at 110° C., and annealed at 950° C. for 30 minutes. The thus-obtained pigment exhibits a beautiful yellowish-golden color and high luster. The yield is about 40.5 kg. of gold pigment with a content of about 49.3% mica, about 37.5% $TiO_2$, 5.3% NiO, and 7.9% $Sb_2O_3$. The pigment which is gold colored when viewed from above is lemon-yellow in transillumination.

Instead of $NiSO_4$, it is also possible to employ the corresponding amount of $CoCl_2$ or $CoSO_4$.

Example 5

10 kg. of the mica employed in Example 1 is suspended in 150 liters of desalinated water. The suspension is adjusted to a pH of 3.5 by the addition of a hydrochloric zirconium tetrachloride solution (250 g. of $ZrCl_4$ and 40 g. of HCl per liter). The suspension is heated to 70° C. under agitation and again adjusted to a pH of 3.5 by the addition of 10% hydrochloric acid.

1.2 kg. of $FeCl_3 \cdot 6H_2O$ is dissolved in 0.7 liter of hydrochloric acid (37%) and 8 liters of water and mixed with 20 liters of a 25% hydrochloric zirconium tetrachloride solution (3% hydrochloric acid). This solution of the mixed salts is allowed to flow into the suspension at a rate of 6 liters per hour. During this procedure, the pH is maintained at 3.5 by the addition of 35% NaOH.

Thereafter, at the same rate, a clear and colorless 25% hydrochloric zirconium tetrachloride solution is introduced into the suspension. Again, the pH is maintained constant at 3.5 by the addition of sodium hydroxide.

The coating period is about 12 hours. After the termination of precipitation, a total of about 15 kg. of $ZrCl_4$ and 1.20 kg. of $FeCl_3 \cdot 6H_2O$ has been consumed.

The resultant pigment is tempered in the suspension at 80° C. for about 3 hours, then washed salt-free with water, and dried at 120° C. Thereafter, the pigment is annealed for 45 minutes at 950° C. There is thus obtained 18 kg. of a gold pigment containing about 55% mica, 43% $ZrO_2$, and about 2% $Fe_2O_3$.

In place of the $ZrCl_4$ solutions, it is possible in each case to employ mixtures of $TiCl_4$ and $ZrCl_4$, for example in a ratio of 1:1 or 3:1, likewise resulting in pigments having a magnificent hue and high luster.

Example 6

10 kg. of ground light-colored mica of the muscovite type, particle size about 10–30 microns, thickness about 0.1 micron, is suspended in 100 liters of desalinated water. The suspension is adjusted to a pH of 2.5 with hydrochloric titanium tetrachloride solution (250 g. of $TiCl_4$/l. and 30 g. of HCl/l.), then is heated to 70° C. and readjusted to a pH of 2.5 by the addition of 10% hydrochloric acid. Into this suspension, there is added at a rate of 6.5 liters per hour a yellowish-brown solution of 1.3 kg. of $FeCl_3 \cdot 6H_2O$ dissolved in 0.3 liter of hydrochloric acid (sp. gr.=1.18) and 4 liters of water and mixed with 5 liters of a 25% hydrochloric titanium tetrachloride solution (HCl content 3%). During this step, the pH is maintained at 2.5 by the addition of 35% NaOH. Thereafter, a 25% hydrochloric titanium tetrachloride solution is introduced into the suspension at the same rate. The coating period is 12 hours.

The termination of precipitation is determined by color comparison with a standard having a violet interference color. The precipitation is interrupted when about 21 kg. of $TiCl_4$ and 1.3 kg. of $FeCl_3 \cdot 6H_2O$ have been consumed. The thus-obtained pigment is then tempered in the suspension for 4 hours at 70° C., washed free of salt, and dried at 120° C. Thereafter, the pigment is annealed for 1 hour at 950° C. The resultant bright orange pigment simultaneously exhibits the interference color purple. There is thus obtained 19 kg. of a lustrous purple pigment containing about 52.0% mica, 46.0% $TiO_2$, and about 2% $Fe_2O_3$.

Example 7

One kilogram of ground light-colored mica of the muscovite type, particle size about 30–200 microns, specific surface 2–2.2 m.²/g., thickness about 0.5 micron, is suspended in 10 liters of desalinated water. This suspension is adjusted to a pH of 2.2 with hydrochloric titanium terachloride solution (250 g. of $TiCl_4$/l. and 30 g. of free HCl/l.). The suspension is heated under agitation to 70° C. and maintained at this temperature during the entire coating process. The pH, which has risen to about 6 during the heating step, is readjusted to pH 2.2 by the addition of 10% hydrochloric acid.

In another vessel, 125 g. of $FeCl_3 \cdot 6H_2O$ is dissolved in 70 ml. of hydrochloric acid (sp. gr.=1.19) and 1150 ml. of water and admixed to 4 liters of 10% hydrochloric titanium tetrachloride solution (hydrochloric acid content 3%). The thus-obtained brown titanium salt/iron salt solution is passed into the mica suspension at a rate of 2 liters per hour. By the simultaneous addition of 10% sodium hydroxide solution, the pH of the suspension is maintained constant at 2.2. Thereafter, about 8 liters of a 10% colorless hydrochloric titanium tetrachloride solution is passed into this suspension at the same rate.

The overall coating period is 6 hours. The end of the precipitation is determined by color comparison with a standard.

The thus-obtained pigment exhibits the interference color orange and a yellowish golden particle color. The pigment is distinguished from the finer pigments by a vibrant, strongly reflecting sparkle. The pigment is tempered for another 2 hours at 70° C., washed free of salt, dried, annealed at 850° C. for 30 minutes, and then passed through a screen having mesh openings of 200 microns. The resultant pigment resembles coarse gold dust. The orange interference color turns to yellowish gold during annealing for 1 hour at 950° C.

Approximately 1.4 kg. of this golden pigment is obtained, consisting of 72% mica, 26% $TiO_2$ and 2% $Fe_2O_3$.

This pigment, because its grain structure is visible to the naked eye, is suitable for special purposes, for example for road markers and road signs, children's toys, wall coverings, and advertising effects.

(B) UTILIZATION OF THE PIGMENTS

Example 8

A high-pressure polyethylene in granular form (for example "Lupolen" 1800 S) is mixed with 1.5% by weight of dioctyl phthalate and blended in a tumbling mixer for 15 minutes. After the addition of 1% by weight of nacreous pigment according to Example 1, the mixing operation is continued for 30–60 minutes. The resultant granules contain the pigment uniformly distributed on the surface, and results, when processed in a screw injection molding machine, in flawless injection-molded articles having a golden hue.

Example 9

The pigment of Example 1 is made into a paste with twice the amount by weight of a mixture of equal parts of n-butyl acetate, ethylene glycol monoethyl ether, and dibutyl phthalate. Of the thus-obtained suspension, 2.5 g. is mixed with 250 g. of an unsaturated polyester resin (for example, "Palatal P 66"), and the composition is cured after the addition of 0.4% by weight of a 1% solution of cobalt octoate and 2.4% by weight of a 50% ketone peroxide in a centrifugal drum. After curing, a polyester sheet is obtained having a uniform nacreous character with a golden hue, from which buttons can be manufactured, for example.

Example 10

One gram of the pigment of Example 6 is suspended, by means of intensive mechanical agitation, in 99 g. of a nitro-cellulose lacquer having the following composition:

|   | Percent |
|---|---|
| Collodion | 5 |
| n-Butyl acetate | 45 |
| Ethyl acetate | 50 |

Into this lacquer are dipped polystyrene beads strung on cords, which bead strings are then dried in the air. By repeating the dipping process 5–7 times, red beads are obtained having a high nacreous luster.

Example 11

A lipstick mass is produced from the following components:

|   | Percent |
|---|---|
| Beeswax | 15 |
| Lanolin (hydrous wool fat) DAB 7 | 15 |
| Cetyl alcohol | 2.5 |
| Castor oil | 62.5 |
| Polyethylene glycol having a molecular weight of 600 | 5 |

This base composition is mixed with the following constituents:

|   | Percent |
|---|---|
| Lustrous pigment according to Example 2 | 15 |
| C–Red 1 [1] | 0.2 |
| C–Red 30 [1] | 0.1 |
| Colorless lipstick composition, up to | 100.0 |

[1] Designation by German Color Commission.

The red lipstick composition exhibits a gold-colored nacreous luster.

Example 12

80 g. of tallow, 60 g. of coconut oil, and 40 g. of castor oil are slowly melted together at 80° C. At 80° C., 100 ml. of 35% sodium hydroxide solution is added and the saponification is continued at a temperature of 70–80° C. for another 3–4 hours.

Without salting out the thus-produced soap, 30 g. sugar is dissolved in 30 ml. of hot water and 40 ml. of ethanol is added. The thus-obtained mixture is agitated at a temperature of 70° C. Maintaining the temperature of 70° C., 11 g. of gold colored nacreous pigment according to Example 1 is uniformly distributed in the soap under agitation. The soap is rapidly cooled in an ice bath under further agitation.

390 g. of fresh soap is obtained having a beautiful golden luster. The pigment content is about 3%.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

The embodiments of the invention in which an exclusive property or privilege is claimed are defined as follows:

1. A colored pigment composition consisting essentially of translucent micaceous flakes having a diameter of 2 to 1,000 microns and a thickness of 0.005 to 1 micron and having on both faces two superimposed bottom and top firmly adhering layers, each of said layers having a uniform thickness, the bottom layer contacting the mica consisting essentially of a mixture of:
   (a) a member selected from the group consisting of titanium oxide, hydrated titanium oxide, zirconium oxide, hydrated zirconium oxide, and mixtures thereof; and
   (b) a different inherently colored metallic oxide selected from the group consisting of oxides of iron, chromium, nickel, cobalt, antimony, aluminum, silicon, tin, bismuth, and mixtures thereof; and the upper layer disposed on top of said bottom layer consisting of a member selected from the group consisting of titanium dioxide, zirconium oxide, hydrated oxides and mixtures thereof, the bottom layer being about ⅓ of the thickness of the top and bottom layers, and the proportion of the inherently colored metallic oxide present in the bottom layers amounting to not more than 8% by weight of the total pigment.

2. A pigment composition as defined by claim 1 wherein said different oxide is an inherently colored oxide of iron, chromium, nickel or cobalt.

3. A pigment composition as defined by claim 1 wherein said different oxide is an inherently colored oxide selected from the group consisting of iron (III) oxide, chrominium (III) oxide, nickel (II) oxide, and cobalt (II) oxide.

4. A pigment composition as defined by claim 2 wherein the proportion of the inherently colored metallic oxide present in the bottom layer amounts to up to about 2–3% by weight of the total pigment.

5. A pigment composition according to claim 2 wherein the bottom layer further contains antimony (III) oxide, in an amount of not more than 10% by weight of the total pigment.

6. A pigment composition according to claim 1 wherein the total coating thickness of both layers is 30–180 nanometers.

7. A pigment composition as defined by claim 1 wherein the bottom layer is a mixture of an Fe (III) oxide and a member selected from the group consisting of titanium dioxide and a hydrate thereof, and the top layer consists of a member selected from the group consisting of titanium dioxide and the hydrate thereof, the amount of the iron oxide being 2–3% by weight of the total pigment.

8. A pigment composition as defined by claim 7, containing about 53–56% mica, about 42–45% $TiO_2$, and about 2–3% $Fe_2O_3$ in the calcined state.

9. A pigment composition according to claim 7, said mica flakes having a particle diameter of 5–50 microns, said bottom layer consisting of a uniform thickness of 20–27 nanometers of $Fe_2O_3$ and $TiO_2$, and said top layer consisting of a uniform thickness of 40–54 nanometers of $TiO_2$.

10. A pigment composition according to claim 7, consisting in the annealed form of about 52% by weight of mica, about 46% by weight of $TiO_2$, and about 2% by weight of $Fe_2O_3$.

11. A pigment composition according to claim 7, said mica flakes having a particle diameter of 5–50 microns, said bottom layer consisting of a uniform thickness of about 30–33 nanometers of $Fe_2O_3$ and $TiO_2$, and said top layer consisting of a uniform thickness of about 60–66 nanometers of $TiO_2$, the amount of $Fe_2O_3$ being 2–3% by weight of the total pigment.

12. A process for the production of a pigment composition, comprising feeding into an aqueous suspension of mica flakes at a substantially constant temperature between about 50 and 100° C. and at a substantially constant pH between 0.5 and 5.0:

(a) an aqueous metallic salt solution consisting essentially of a member selected from the group consisting of a titanium salt, a zirconium salt and mixtures thereof, said member being in a concentration of 0.01–4.0 mol/liter, and another salt of a metal selected from the group consisting of iron, chromium, nickel, cobalt, antimony, aluminum, silicon, tin, bismuth, and mixtures thereof, said other salts being in a total concentration of 0.02–1 mol/liter, said solution having a content of free acid corresponding to a molarity of 0.002–3;

(b) after the feeding of solution (a), feeding an aqueous, 0.01 to 4 molar solution consisting essentially of only a member selected from the group consisting of a titanium salt, a zirconium salt, and mixtures thereof, said solution having a content of free acid corresponding to a molarity of 0.002–3;

(c) simultaneously with the feeding of both (a) and (b), passing into the suspension an aqueous, 0.025- to 10-molar basic solution of a base selected from the group consisting of an alkali metal hydroxide, ammonium hydroxide, or an equivalent amount of gaseous ammonia; with the provisions that:

(d) the amount of salt fed per minute is approximately $0.01$–$25 \cdot 10^{-5}$ mol per m.$^2$ of mica surface, (e) the thickness of the metallic oxide layer precipitated by solution (a) amounts to about one-third of the total coating thickness of the precipitated oxide layers.

13. A process according to claim 12 wherein titanium salt is titanium tetrachloride.

14. A process according to claim 12 wherein said another metallic salt in solution (a) is iron(III) chloride.

15. A process according to claim 12 wherein said another metallic salt is chromium(III) chloride.

16. A process according to claim 12 wherein said another metallic salt is a mixture of antimony(III) chloride and nickel(II) or cobalt (II) chloride.

17. A process according to claim 12 wherein said another metallic salt is a mixture of antimony(III) chloride and chromium(III) chloride.

18. A process according to claim 12 wherein the pH of the mica flake suspension is adjusted, prior to the beginning of the hydrolysis, to a pH of between 0.5 and 5.0, by adding an aqueous acidic solution containing a member selected from the group consisting of a titanium salt, a zirconium salt and mixtures thereof.

19. A process as defined by claim 18 wherein the pH is adjusted to 1.5–4.0.

20. A process according to claim 12 wherein precipitation is conducted at 70–80° C., a pH of 1.5–4.0, and with a feed rate per minute of the metallic salts of less than $5 \cdot 10^{-5}$ mol per m.$^2$ of mica surface in the suspension.

21. A process according to claim 12 wherein the feed rate per minute of the metallic salt solutions is between $0.1$ and $2 \cdot 10^{-5}$ mol per m.$^2$ of mica surface in the suspension.

22. A process according to claim 12 further comprising tempering the pigment after precipitation for about 2–4 hours at about 70° C.

References Cited

UNITED STATES PATENTS

| | | | |
|---|---|---|---|
| 3,087,828 | 4/1963 | Linton | 106—291 |
| 3,087,829 | 4/1963 | Linton | 106—291 |
| 3,087,827 | 4/1963 | Klenke et al. | 106—291 |
| 3,440,075 | 4/1969 | Marshall | 106—291 |
| 3,342,617 | 9/1967 | Jackson | 106—291 |
| 3,331,699 | 7/1967 | Marshall et al. | 106—291 |

HELEN M. S. SNEED, Primary Examiner

U.S. Cl. X.R.

106—308 B